No. 832,226. PATENTED OCT. 2, 1906.
L. T. ALTON.
INCANDESCENT GAS LAMP.
APPLICATION FILED APR. 2, 1902.
5 SHEETS—SHEET 1.
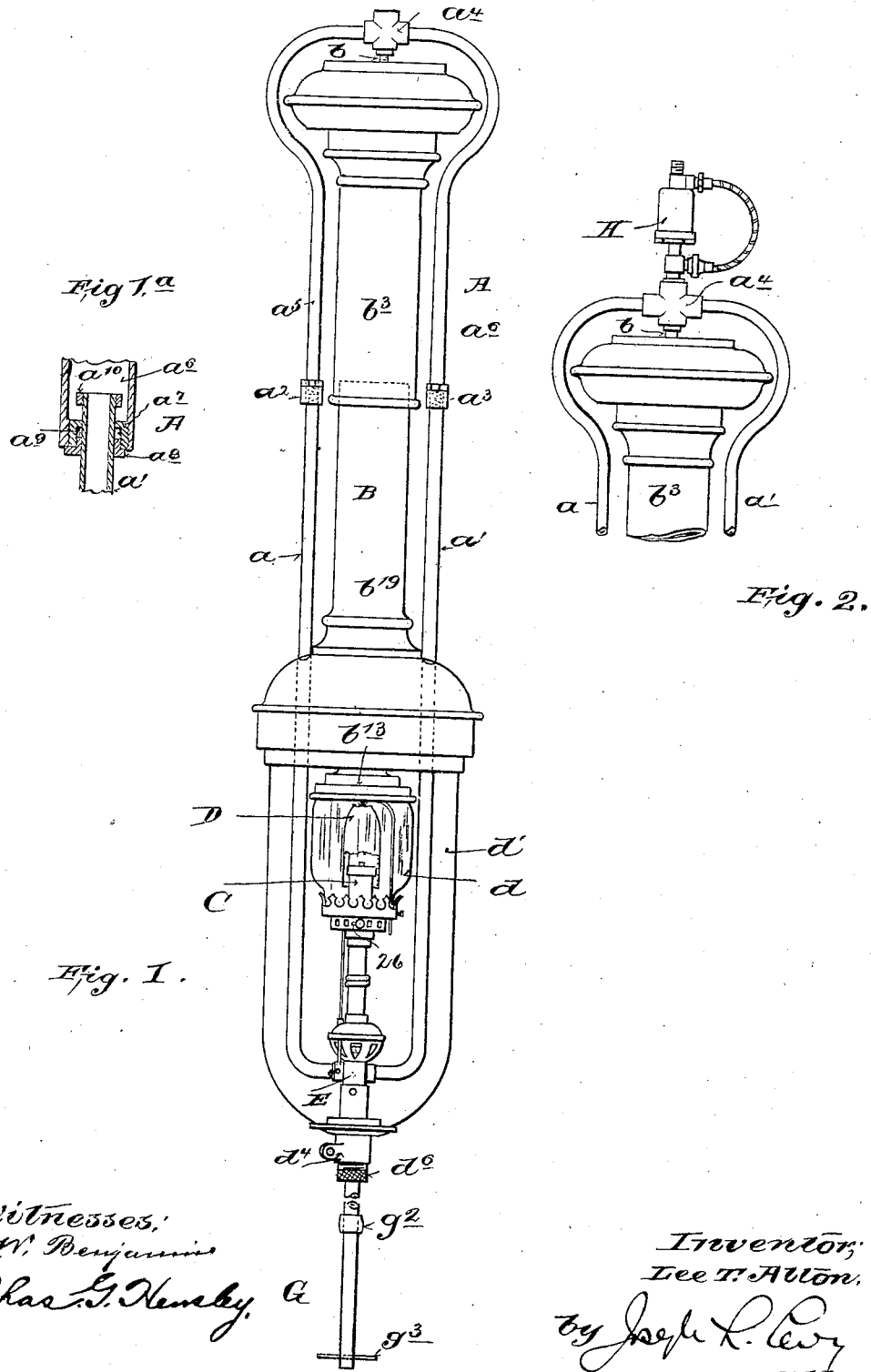

No. 832,226. PATENTED OCT. 2, 1906.
L. T. ALTON.
INCANDESCENT GAS LAMP.
APPLICATION FILED APR. 2, 1902.
5 SHEETS—SHEET 2.
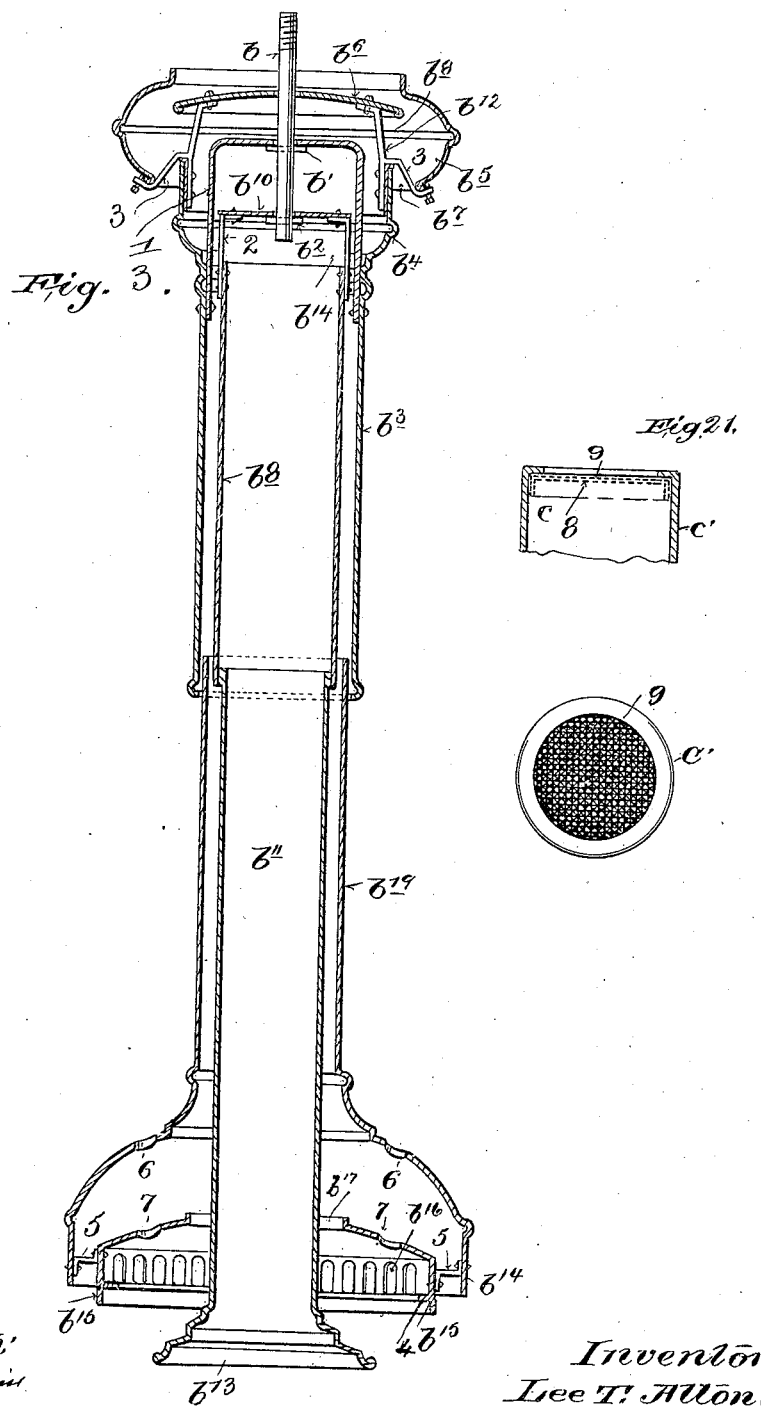
Witnesses:
C. W. Benjamin
Chas. G. Hensley
Inventor:
Lee T. Alton,
by Joseph L. Levy
atty

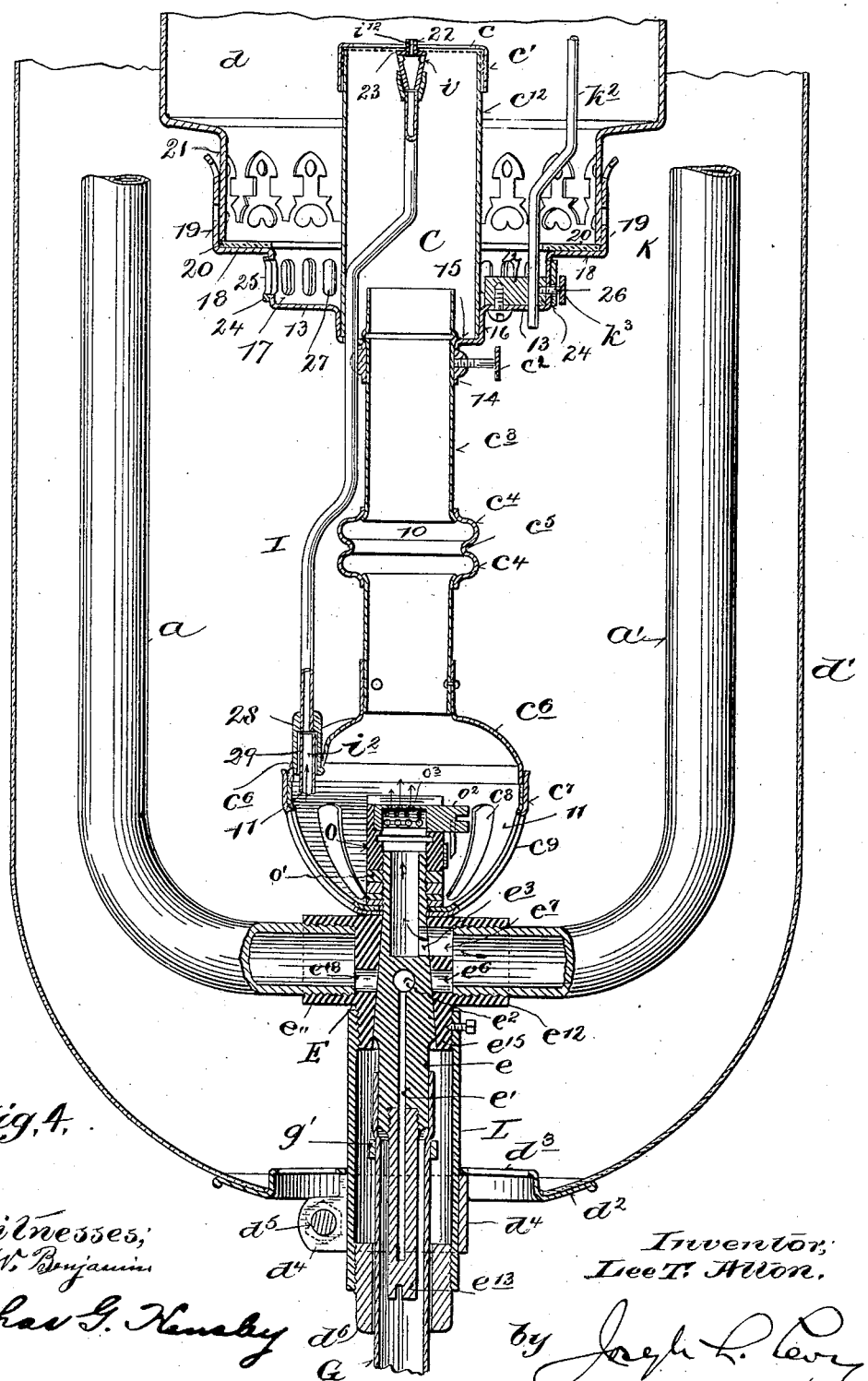

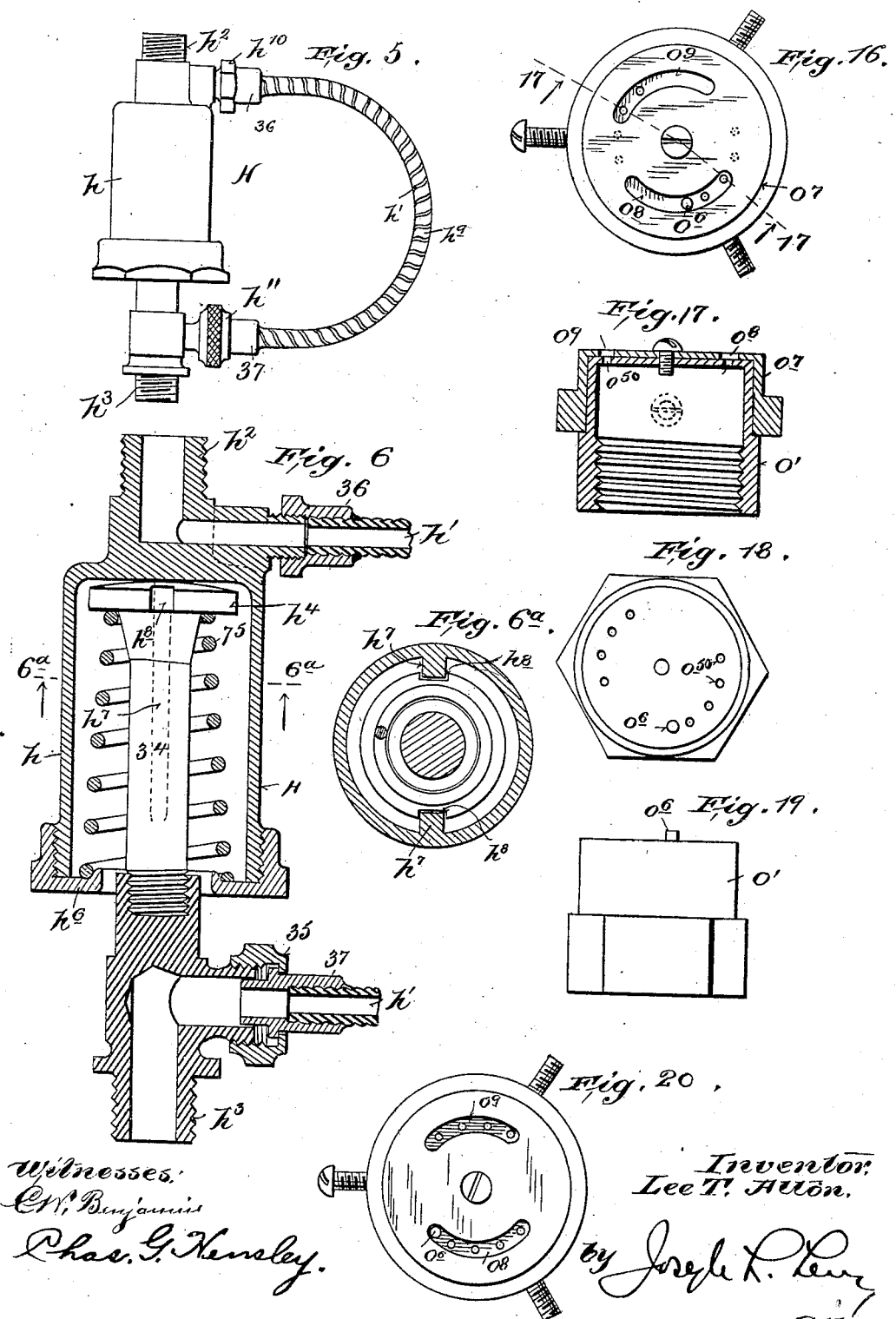

No. 832,226. PATENTED OCT. 2, 1906.
L. T. ALTON.
INCANDESCENT GAS LAMP.
APPLICATION FILED APR. 2, 1902.
5 SHEETS—SHEET 5.
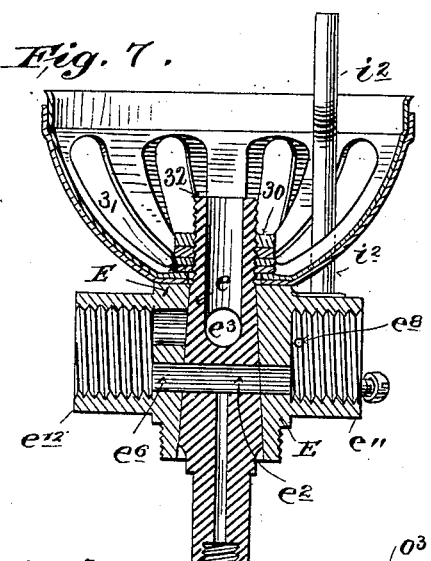
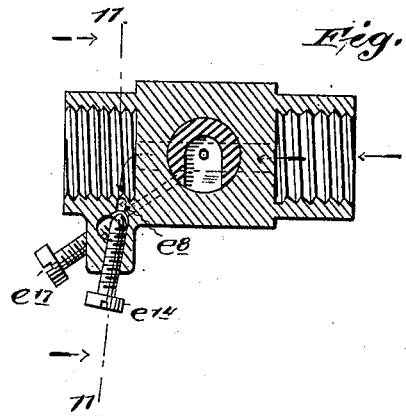
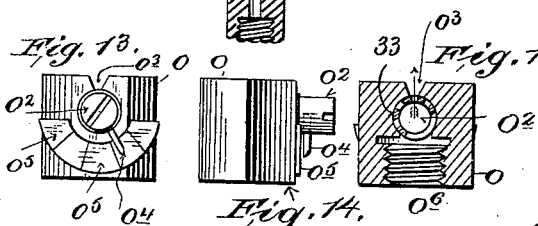
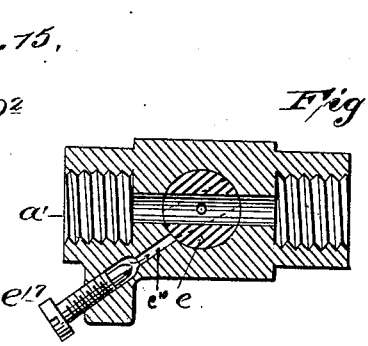
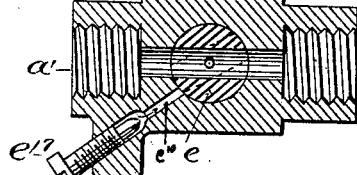
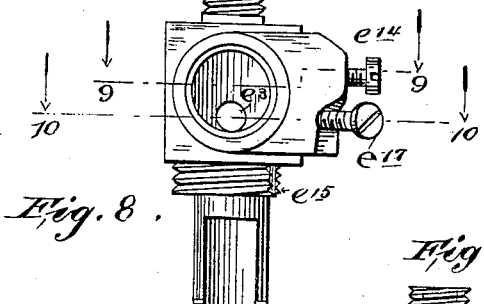
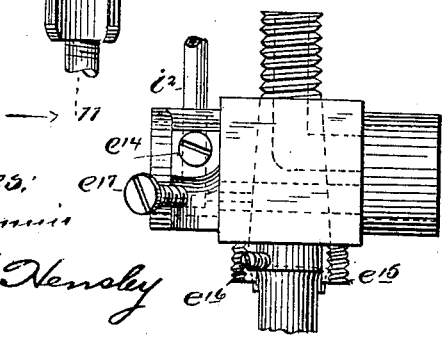
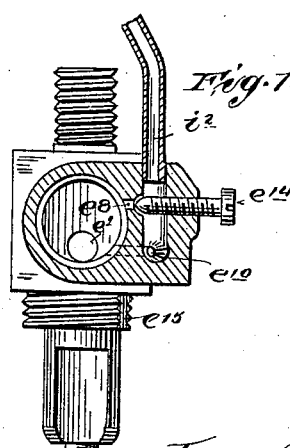
Witnesses:
Inventor:
Lee T. Alton,
by
atty

UNITED STATES PATENT OFFICE.

LEE T. ALTON, OF BROOKLYN, NEW YORK.

INCANDESCENT GAS-LAMP.

No. 832,226.        Specification of Letters Patent.        Patented Oct. 2, 1906.

Application filed April 2, 1902. Serial No. 101,025.

*To all whom it may concern:*

Be it known that I, LEE T. ALTON, a citizen of the United States, and a resident of the borough of Brooklyn, county of Kings, and State of New York, (whose post-office address is 1244 Fulton street, in said city,) have invented certain new and useful Improvements in Incandescent Gas-Lamps, of which the following is a specification.

The object of my invention is to provide a new and improved incandescent gas-lamp having many new features.

It provides a lamp having a new form of the ventilator-top and an improved form of flues connecting the lamp proper with the ventilating-top.

It further provides a means for regulating the flow of the gas in the different parts of the lamp and for adjusting the rate of flow of gas in the different connections of the lamp.

A further improvement exists in the means for suspending the lamp so as to avoid jarring.

Further features and advantages will appear in the following description, in which reference is made to the accompanying drawings, wherein the same reference-letters refer to similar parts of my invention.

Figure 1 illustrates a perspective view of my lamp. Fig. 1$^a$ is an enlarged side elevation of a form of connection for the supporting-bars, partly in section. Fig. 2 illustrates the suspending means connected to the lamp. Fig. 3 illustrates the ventilating top and flues of the lamp. Fig. 4 illustrates a sectional view of the burner and the gas-cock. Fig. 5 illustrates a perspective view of the suspending means for the lamp. Fig. 6 illustrates a vertical sectional view of the suspending means, and Fig. 6$^a$ illustrates a horizontal sectional view taken on the line 6$^a$ 6$^a$ of Fig. 6. Fig. 7 illustrates a vertical sectional view of the gas-cock. Fig. 8 illustrates a perspective view of the gas-cock. Fig. 9 illustrates a horizontal view of the gas-cock, taken on the line 9 9, Fig. 8. Fig. 10 illustrates a sectional view of the gas-cock on the line 10 10. Fig. 11 illustrates a sectional view of the gas-cock, taken on the line 11 11 of Fig. 9. Fig. 12 illustrates a perspective view of the gas-cock, showing the gas connections of the parts of the cock. Fig. 13 illustrates a check which is placed above the cock and controls the flow of the gas into the mixer-tube. Fig. 14 illustrates a side view of the check. Fig. 15 illustrates a vertical sectional view of the check; Fig. 16, a top view of the damper of a modified form of check. Fig. 17 illustrates a sectional view taken on the line 17 17 of Fig. 16. Fig. 18 illustrates a top view of the modified form of the check. Fig. 19 illustrates a side view of the check. Fig. 20 illustrates a top view of the check-damper in a position different from that shown in Fig. 16. Fig. 21 is a section, and Fig. 22 a plan, of the double-mesh burner-tip.

In Fig. 1, A indicates a supporting means for the lower part of my lamp, including the burner, globes, and flues, of which $a$ $a'$ $a^5$ $a^6$ are pipes made in two parts extending from the gas-connector $a^4$ at the top of the lamp to the gas-cock casing E at the bottom of the lamp. One of these parts is connected directly with the main gas-supply, while the other is not connected, it being plugged at the connector $a^4$. The two parts $a$ $a'$ telescope one into the other and are connected by threaded unions $a^2$ $a^3$. However, I prefer to make the connection of these parts adjustable, so that the height of the lamp may be regulated, in which case I employ a tight and telescopic joint, as illustrated in Fig. 1$^a$. In this figure $a^6$ is the upper part or gas-tube and $a'$ the lower part. $a^7$ is a packing-cup screwed into the end of the pipe $a^6$, and $a^8$ is a gland working in the cup, and through the cup and gland and through packing (asbestos or other suitable material) $a^9$ in the cup extends the upper end of the pipe $a'$. Both parts $a$ $a^5$ and $a'$ $a^6$ are hollow, and each may be provided with the sliding joint. By tightening the packing the sections may be held together and the gas-light and the lamp adjusted as to height. The end of the pipe $a'$ or $a$ has a stop $a^{10}$ thereon to prevent separation of the parts.

The chimney or flues B conduct the hot air from the Bunsen flame and also from the outside globe of the lamp. In order to accomplish this, and also to protect the lamp from rain or wind, I have provided a new ventilating-top which is supported on the flues. The whole is supported by a rod $b$, which is screwed into the gas-connector $a^4$. This rod $b$ is provided with pins $b'$ and $b^2$, which supports the flues $b^3$ and $b^8$ by means of the bails 1 2. The flue $b^3$ is provided with a flange or skirt $b^4$, which supports the outside wind-shell $b^5$ and detachably support the top rain-protector $b^6$ by means of brackets $b^{12}$ and arms 3. The wind-shell $b^5$ is so supported by the bracket $b^{12}$ 3 as to allow an annular opening $b^7$ between the shells $b^5$ and the skirts $b^4$. The rain-protector $b^6$ is also so supported relative to the flues $b^3$ and the tube $b^5$ as to give an annular opening $b^7$, leading to the outside atmosphere. The inner flue $b^8$ is also provided with the brackets 2 for supporting the top $b^{10}$, so as to allow an opening $b^{14}$ at the top of the flue $b^8$. By this arrangement there is a free ventilation from the globes of the lamp to the outside atmosphere, and yet the globes are completely protected from drafts of any kind and from the rain or snow.

The flues are made, preferably, in two parts which telescope one into the other, although non-telescopic flues may be used. As illustrated, the lower parts of the flues $b^{11}$ $b^{19}$ telescope into the corresponding parts $b^8$ and $b^3$ at the top of the flue. The lower part of the flue $b^{19}$ is provided with a skirt $b^{14}$ for fitting over the upper edge of the outer globe $d$, while the lower part of the flue $b^{11}$ is formed into a skirt $b^{13}$, adapted to fit over the upper edge of the inner globe $d'$. Another ventilating-skirt $b^{15}$ is also provided for securing the outside globe $d$ with an annular flange 4, which rests upon the upper edge of the outer globe $d$, the skirts $b^{14}$ $b^{15}$ being united by tongues 5. The skirt $b^{15}$ is located on upper edge of the outside globe $d$ and has a number of openings $b^{16}$ and an annular opening $b^{17}$ for providing a connection from the interior of the globe $d$ to the ventilating-flue $b^{19}$, which permits hot air and gases to escape from the globe $d$ and to force the superheated air encircling the chimney or flue to escape at the top, and thus help to increase the velocity of the draft. Both the skirts $b^{14}$ $b^{15}$ have holes 6 and 7 for the passage of the tube $a$ $a'$. As the force of the draft varies with the length of the flues, it is evident that the draft may be regulated by sliding the lamp up or down.

The burner C has a clip $c^{12}$, on the top of which is located a double gauze $c$, fastened to the tube $c^{12}$ by the annular ring or tip $c'$. The double gauze is composed of two layers 8 9 of gauze so situated relative to each other that the lower gauze 8 fits across meshes of the upper gauze 9. The size of the weave of the two parts of the gauze may vary. The weave in the two parts may be of the same size, or upper part may be of a finer weave than the lower part. These two parts can also be situated so as to permit a small air-space between them. By this arrangement of the gauzes a more perfect mixture of the gas and air is accomplished before the gases reach the flame, and the gauze is then protected from melting by the intervening space between them, the lower gauze drawing off the heat from the intensified upper gauze. This burner-tube is supported by the globe-supporter K, which is fastened to the mixer-tube $c^3$ by a threaded screw $c^2$. The mixer-tube is provided at its center with a mixing-chamber 10, provided with a plurality of channels $c^4$ $c^4$ and a ridge $c^5$, extending toward the interior of the chamber, so that when the gas coming from the gas-cock and the air from the damper located in the lower part of the lamp reaches the gas-mixer the gases are caused to flow in and out the channels and more perfectly mix, where they again expand and further unify before reaching the burner-tube $c^{12}$.

The lower part of the mixer-tube $c^3$ is provided with a hemispherical-shaped skirt $c^6$, resting upon a hemispherical piece 11, having openings $c^8$. On the outside of this hemispherical piece 11 there is located a hemispherical damper $c^7$, having openings $c^9$, adapted to register with the openings $c^8$. By means of the damper $c^7$ the openings $c^8$ and $c^9$ may be caused to register more or less, according as the amount of air for the Bunsen burner is to be diminished or decreased, parts $c^6$ 11 forming the initial chamber of the tube $c^3$.

Upon the holder K the mantle of the lamp is supported by means of the rod $k^2$, which is fastened by means of screws $k^3$, passing into a block 12, secured to the flange 13 of the holder $k$.

The holder K comprises the annular part 14, through which the screw $c^2$ passes to fix it to the tube $c^3$ (although the holder may be made fast to the tube $c^3$ and the adjustment omitted) to allow the holder to be adjusted up and down on the tube $c^3$ to free the holder and globe $d$ from the lamp. This end, however, is secured through the telescoping of the draft-tube. From the annular part 14 extends a flange 15, surrounded by the annular web 16, between which and the flange 15 rests the burner-tube $c^{12}$. From the web 16 extends the flange 13. From the outer edge rises an apertured flange 17, through which the screw $k^3$ passes, and from the flange extends the flange 18 and from this the flexible rim 19. Upon the flange 18 rests an insulating washer or gasket 20, upon which rests the inner globe $d$, shoulder 21, the skirt $c^6$, having a lug 28, into which the lower end of the tube I passes and an enlarged bore 29, into which the upper end of the tube $i^2$ separably and snugly passes. A damper 24, with openings 25, adapted to register with openings 27 on the flange 17, is placed on said flange, so that the amount of air passing through said flange may be regulated or cut off, thus preventing all admission of air to the outside of the mantel.

Supported on the skirt $c^6$, located in the lower part of the lamp, is a pilot-light tube I. This pilot-tube I extends upward to the center of the burner C and through the flange 15 and at the top is provided with a tip $i'$, having openings below the double gauze $c$ of the burner and a passage $i^2$ for the purpose of making a Bunsen flame. The tip $i'$ has a lug 22 and shoulder 23 to support and steady the gauze.

The gas-cock is connected to the pilot connection I by means of the tube $i^2$ C. By means of this pilot-light the Bunsen burner may be lighted by merely opening the gas-cock, as hereinafter described.

The gas-cock located in the lower part of the lamp has a number of gas connections leading from the supply-pipe $a'$ to the pilot-tip $i'$ and the burner C, as illustrated in Figs. 4, 7, 8, 9, 10, 11, and 12. The gas-plug $e$ has a drip-opening $e'$ extending from a horizontal opening $e^2$ to the bottom of the plug. The horizontal opening $e^2$ extends completely through the plug $e$ and provides a gas connection for the pilot-jet. At the top of the plug is a bent passage $e^3$, leading to the check at the top of the plug. The gas-cock casing E is provided with a plurality of connections adapted to register with the plug connections when the cock is at different positions relative to its casing. The connection $e^6$ is adapted to register with $e^2$ and extends completely through the casing of the cock. There is also provided a connection $e^7$ which extends to the center chamber of the casing and is adapted to register with the opening $e^3$. An opening $e^8$ is also provided which leads from the interior of one of the screw-threaded connecting-arms of the cock to the pilot-light connection $e^9$, also located in the gas-cock casing. At the bottom of the pilot-light connection of the gas-cock casing is provided a similar opening $e^{10}$, which opens into the center chamber of the gas-cock casing and is adapted to register with the opening $e^2$ of the plug when the plug is in such a position that it partly registers with the main supply connection $e^6$. The connections $e^{10}$ provides a means for turning on a greater flow of gas to the pilot-light and allowing it to flash just as the main opening $e^3$, leading from the gas-supply pipe $a'$, is opened and igniting the gas at the top of the main burner-tube C.

The gas-cock casing is also provided with arms $e^{11}$ $e^{12}$ for connecting with the supports $a$ and $a'$. The latter support $a'$ also constitutes a means for supplying gas to the gas-cock. The gas-cock casing is also provided with an arm $e^{15}$, having a tube L for preventing the turning of the cock $e$ unless a key adapted to fit the plug-stem is used. The cock-handle is so constructed as to have a peculiar form to permit of the use of a certain kind of a key. The handle may be either square or it may be cylindrical, but flattened on one side or both sides, so that it may be turned by an instrument inserted in the tube L. A segment of the arm $e^{15}$ is removed, and a threaded screw $e^{16}$ is inserted in the gas-cock, so as to control the amount of turning of the plug, this threaded screw $e^{16}$ striking against the ends of the remaining part of the arm $e^{15}$ at the limits of the motion of the cock. At the lower end the plug is provided with a drip-holder $e^{13}$ to collect any oil that may be used to lubricate the cock or any products that may collect from the gas in the cock.

For controlling the openings leading to the jet $i'$ of the pilot-light there are provided pin-valves $e^{14}$ and $e^{17}$, which are located in the cock-casing and adapted to register with the openings $e^8$ and $e^{10}$ and regulate the flow of the gas through the said openings.

The operation of the cock is as follows: When the main burner C is turned off, the plug is in the position shown in Fig. 7. The gas connection is then from the gas-supply $a'$ through the openings $e^6$ of the gas-cock casing, the opening $e^2$ of the gas-cock, and the opening $e^8$ of the gas-cock which is controlled by the pin-valve $e^{14}$, which leads to the pilot-light connection $i^2$ and a tube I to the pilot-jet $i'$. By this means the pilot-light is continually fed from the gas-supply during the time that the main burner is cut off, and a small flame exists at such times at the top of the burner-tube. If now it is desired to light the lamp, the plug is turned, first connecting the opening $e^2$ with the opening $e^{10}$, which allows a greater flow of gas to the pilot-light connections $i^2$ than is permitted by the pin-valve $e^{14}$. This causes the pilot-light to flash up just as the gas connections $e^3$ begins to register with the connections $e^7$ with the gas-cock, and the main jet at the top of the burner-tube C is ignited. The cock is operated still further to fully open the connections between the supply $a'$ and the burner-tubes C. At the same time the by-pass $e^{10}$ for the flashing of the parallel jet $i'$ is cut off from connection from the supply $a'$, and the connection between the opening $e^8$ and the gas-supply $a'$ through the arm in the casing $e^{11}$ is cut off. This completely cuts off any gas connection to the pilot-light and prevents any possible carbonizing of the mantle. When the main jet is to be turned off, the reverse steps in the operation occurs, viz: a large supply of gas is permitted to flow through the pilot-jet $i'$, which ignites the pilot-jet, and upon further turning of the gas-cock a permanent connection is provided for the pilot-jet, while at the same time the main burner is closed from the gas-supply and the main jet is turned out. The pilot-light continues to burn until the main jet is again to be turned on.

At the top of the gas-cock is located a check O. Between the check O and the gas-cock casing are located a number of nuts and washers 30 31 for securing the cock in the casing and the check to the top of the cock.

These also revolubly support the parts 11 and $c^9$.

The check is illustrated in Figs. 4, 13, 14, and 15, and consists of a block having a screw-threaded opening $O^6$ in its space, whereby it may be attached to the top 32 of the cock. In the top of the check is located a cylindrical opening 33, in which may be inserted the adjustable cylinder $o^2$. The cylinder $o^2$ has a number of rows of holes. These holes vary in size or in number in the rows. Above the cylindrical check is a wedge-shaped slot $o^3$, which is adapted to register with the holes as the check $o^2$ is turned in different positions. Attached to the check is a pin $o^4$ for indicating the position of the holes of the check relative to the slot in the top of the check. On the outside of the check is located a segmental piece $o^5$, over which the pointer $o^4$ is adapted to move and to show which row of holes is in line with the wedge-shaped slot. A modification of the check is shown in Figs. 16, 17, 18, 19, and 20, which may be readily substituted by separating the hemispherical parts $c^6$ and 11, as well as the parts of the pilot-tube $l^2$ and I. The check $o'$ has a screw-threaded base similar to the check already described and is fastened to the gas-cock in the same manner. The top of the check has a plurality of holes $o^{50}$, located in two separate rows on the opposite side of the center. The damper $o^7$, having slots $o^8$ $o^9$, is placed on the top of the check $O'$ in such a way that the slots will register with the holes located on the check. The holes in the top of the check are so located that the holes of one row are diametrically opposite to the holes in the row on the opposite side of the center—i. e., the position of any hole in the rows is a little more than one hundred and eighty degrees or a little less than one hundred and eighty degrees from a hole in a row on the opposite side of the center—while, on the other hand, the slots in the damper are so located relative to each other that the ends are either diametrically opposite or are at a greater angle from each other than one hundred and eighty degrees plus the angular distance between any two holes. By this arrangement of the slots and holes it will be seen that when the damper is secured to the top of the check and when the damper is turned about its axis that a single hole will appear first in one slot and then in the other, and then again in the first slot, and so on, until the slots register with all of the holes of the check. There will then be first one hole in one slot and one hole in the other slot, then two holes in one slot and one hole in the other slot, then two holes in one slot and two holes in the other slot, then three holes in one slot and two holes in the other slot, and so on until all of the holes register with the slots. By this arrangement I am enabled properly to distribute the inlets of the gas on each side of the center of the check to allow a more perfect mixture of the gas with the incoming air, and yet to properly regulate the amount of flow without in the least congesting the pressure of the gas. For limiting the motion of the damper the stop $o^6$ is located in one of the slots and fastened to the top of the check $o'$. By either of these forms of the check I am enabled to regulate the amount of flow of gas, and by means of the damper $c^7$, located in the top hemispherical skirt surrounding the check, I am enabled to regulate the amount of air which is fed into the burner C, which affords a perfect regulation of the elements of combustion entering the main burner-tube C.

For opening the gas-cock and allowing gas to pass upward to the check I provide a form of a key G. This key may be of any shape; but I preferably use a rod having an opening in its end of such a shape as to properly register with the handle of the cock. Upon this rod is located an annular nut $d^6$, which may be screwed to the protecting-tube L when the lamp is to be locked or unlocked—that is, the cock is to be opened or closed and the pilot connections is to be closed or opened and the lamp is to be cleaned. A gasket $g'$, of metal, is located on the rod and above annular nut $d^6$. A second gasket $g^2$, of rubber, is also located upon the key G and a sufficient distance below the upper end of the key G to allow room for the globe $d$ to rest upon the gasket $g^2$ and also to give room to allow for cleaning out the lamp and prevent the breaking of the globe when striking the key. The globe $d$ is supported by a ring $d^2$, having openings $d^3$ to allow the air to circulate in the globe $d$. This support $d^2$ is fastened to the protecting-tube L by means of a nut or split ring $d^4$. This split ring $d^4$ is secured upon the tube L by means of a bolt $d^5$, which draws together the end of the split ring and securely clamps it about the tube L.

When the lamp is to be cleaned, the key is to be inserted into the tube L and, if desired, the gas-cock can be turned off, and the annular nut $d^6$ may then be screwed into the tube L. The bolt $d^5$ may be turned to unclamp the split ring $d^4$, and the supporting-ring $d^2$, with the globe $d$, may be allowed to drop on the key G until the split ring $d^4$ and ring $d^2$ reaches the pin $g^3$. The key G will then support the globe, since the key will be held in the tube L by means of the gasket $g'$. The gasket-pin is so located as to give ample room for cleaning or fixing the lamp above the globe $d$. After the lamp has been cleaned or fixed the globe can again be returned to its position by lifting the split ring and securing it to the tube L, and the key G may be removed by unscrewing the annular nut $d^6$. As shown in Fig. 4, the nut $d^6$ supports the key in position to support the globe, the washer, or gasket $g'$ when the key is dropped, resting on top of the nut $d^6$. When used for turning the cock, the key needs no support except the hand of the operator.

I have also provided a means for suspending my lamp so as to avoid any jarring that may be produced by the wind or by anything foreign to the lamp, the main object being to prevent injury to the mantle. The suspending means H consists of a cylindrical shell $h$, in which is located a buffer. The buffer may be spring-operated or it may be pneumatically operated. The connection with the gas-supply may be made either directly through the buffer by making the buffer air-tight, or it may be made with a by-pass for the gas, which will prevent any possibility of leakage and yet allow free operation of the buffer. I have shown as a preferable form a by-pass $h'$, consisting of a hollow and flexible metal tube $h^a$, which is connected to the gas-connectors $h^2$, located at the top of the suspending means and $h^3$, located at the bottom, by unions 35 36 37 in the usual way. This by-pass can be made perfectly air-tight, and thereby avoid any possibility of leakage of the gas. The buffer consists of a bolt 34, having a head $h^4$. The head $h^4$ operates upon a compression-spring $h^5$, located between the head $h^4$ and inwardly-extending collar $h^6$, screwed to the bottom of the shell $h$. In order to prevent injury to the lamp, I have provided inwardly-extending ribs $h^7$ in the shell $h$ and notches $h^8$, located in the head $h^4$ of the buffer $h^4$. As the buffer moves up and down by the weight of the lamp and the operation of the spring $h^5$, the notches ride over the ridges $h^7$ and prevent the lamp from turning about its axis. It will be seen by this arrangement that the lamp will be spring-suspended, and all jarring of the mantle and of the lamp will be entirely avoided.

The structure and the embodiment of my invention may be varied in many ways without departing from the spirit of my invention. I do not limit myself to the particular structure shown and described, but I have illustrated in the drawings and described merely the preferable form of my invention.

What I claim, and desire to secure by Letters Patent, is as follows:

1. In a gas-lamp, the combination of a plurality of concentric flues having telescoping parts and skirts located at the lower end of each of said flues and adapted to connect with the globes of the lamps.

2. In a gas-lamp, the combination of a pair of concentric telescoping flues, a pair of brackets located on each of said flues, one pair of said brackets supporting a rain-protector and a wind-protector on the outer flue, and the other pair of the said brackets having a protecting-disk located on the top of the inner flue and skirts located at the bottom of each of the said flues for connecting the flues to the globe of the lamp.

3. In a lamp, the combination of a pair of concentric telescopic flues having two pairs of brackets, one pair of said brackets supporting the rain-protector at the top of the outer flue, the other pair of said brackets supporting a protecting-disk for the inner flue, a rod having pins for supporting the said flues, and a plurality of skirts located at the bottom of said flue for connecting the globes of the lamp with the said flues.

4. In a lamp, the combination of a telescoping support, one of said supports constituting a gas-supply, a pair of concentric flues having telescoping parts and skirts located at the bottom of the said flues and adapted to connect the said flues with the globes of the lamp.

5. In a lamp, a Bunsen burner, a pilot, a cock-casing with an opening connecting said Bunsen burner with a source of gas-supply, and a plurality of openings adapted to connect said pilot with a source of gas-supply, and a plug with a passage controlling the flow of gas through said burner, and a second passage which may be connected with either one of the openings leading to the pilot.

6. In a lamp, the combination of a cock having a handle, a casing for said cock, a tube located on said casing and surrounding the said handle, a globe, a globe-support fastened to the said tube, a key adapted to be connected with the said handle through the said tube and upon the said cock.

7. In a lamp, the combination of a cock having a lock-handle, a casing for said cock, a tube located on the said casing and around the said lock-handle, a support, a globe carried on the said support, a key adapted to register with the said lock, an annular nut located on the said key and adapted to screw into the said tube, a pair of gaskets located on the said key for supporting the said globe when the said support is removed from the said tube.

8. In a lamp, the combination of a plug, a passage in said plug, a drip-opening leading from said passage and means for closing the same, a casing, and a tube surrounding a portion of said plug and closing means.

9. In a lamp, the combination of a check having a gas-opening in its base, a plurality of openings in its top arranged in two arcs of a circle, a damper having two slots adapted to register with the said openings in the top of the said check.

10. In a lamp, the combination of a check having a gas-opening in the base and a plurality of openings in the top arranged in two arcs of a circle and in such a way that no two of the openings will be diametrically opposite, a damper having a pair of slots adapted to register with the said openings and to open first one of said openings on one side and then another of said openings on the other side of the center as the damper is turned.

11. In an incandescent gas-lamp or similar device, a pair of concentric globes and a pair of concentric tubes resting on each of the said globes, so that heated gases are carried through said flues from the spaces in each of said globes.

12. In a lamp, the combination of a telescoping support, one part of said supports forming a gas-supply with a Bunsen burner connected with said support, a gallery adjustably mounted on said burner, and a chimney on said gallery.

13. In a lamp or similar device, the combination of parallel and telescoping pipes with a valve-casing, a Bunsen burner extending from said casing, a gallery extending from said Bunsen burner, a chimney resting on said gallery, and a telescoping flue resting on said chimney.

14. In a lamp or similar device, the combination of parallel and telescoping pipes with a valve-casing, a Bunsen burner extending from said casing, a gallery supported by said Bunsen burner, a chimney resting on said gallery, a globe supported by said casing and telescoping tubes resting on said globe and said chimney.

Signed in the city, county, and State of New York, this 26th day of March, 1902.

LEE T. ALTON.

Witnesses:
CHAS. G. HENSKY,
SOPHIE SETCOSKY.